United States Patent
Yu

(10) Patent No.: US 9,026,582 B2
(45) Date of Patent: May 5, 2015

(54) DEVICE MANAGEMENT METHODS AND RELATED APPARATUS FOR ENHANCING APPLICABILITY OF STATUS MESSAGES IN RESPONSE TO COMMANDS

(75) Inventor: Chun-Ta Yu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 334 days.

(21) Appl. No.: 13/010,200

(22) Filed: Jan. 20, 2011

(65) Prior Publication Data

US 2011/0238740 A1  Sep. 29, 2011

Related U.S. Application Data

(60) Provisional application No. 61/316,610, filed on Mar. 23, 2010.

(51) Int. Cl.
*G06F 15/16* (2006.01)
*H04L 12/24* (2006.01)

(52) U.S. Cl.
CPC .......... *H04L 41/085* (2013.01); *H04L 41/0213* (2013.01); *H04L 41/0233* (2013.01)

(58) Field of Classification Search
None
See application file for complete search history.

(56) References Cited

U.S. PATENT DOCUMENTS

| | | | |
|---|---|---|---|
| 7,865,483 B2 * | 1/2011 | Hernandez | 707/694 |
| 8,001,150 B2 * | 8/2011 | Kim | 707/791 |
| 8,019,899 B2 * | 9/2011 | Zhang et al. | 709/248 |
| 8,327,391 B2 * | 12/2012 | Wang et al. | 719/330 |
| 8,613,062 B2 * | 12/2013 | Chai et al. | 726/6 |
| 8,819,112 B2 * | 8/2014 | Shon | 709/203 |
| 2003/0191827 A1 * | 10/2003 | Piispanen et al. | 709/221 |
| 2006/0026228 A1 * | 2/2006 | Kim | 709/202 |
| 2006/0031449 A1 * | 2/2006 | Hallamaa et al. | 709/223 |
| 2007/0106770 A1 | 5/2007 | Alnas | |
| 2008/0189404 A1 * | 8/2008 | He et al. | 709/223 |
| 2009/0044185 A1 * | 2/2009 | Krivopaltsev | 717/173 |
| 2009/0271781 A1 | 10/2009 | Cui et al. | |
| 2010/0121967 A1 * | 5/2010 | Keum et al. | 709/229 |
| 2010/0257262 A1 * | 10/2010 | Lee et al. | 709/223 |
| 2011/0246428 A1 * | 10/2011 | Alfano et al. | 707/661 |
| 2012/0023216 A1 * | 1/2012 | Chen et al. | 709/223 |

(Continued)

FOREIGN PATENT DOCUMENTS

| | | |
|---|---|---|
| CN | 1969504 A | 5/2007 |
| JP | 2007-172244 A | 7/2007 |
| JP | 2007-520007 A | 7/2007 |

(Continued)

OTHER PUBLICATIONS

SyncML Representation Protocol, Data Synchronization Usage, version 1.1, 2002, pp. 66.*
Kang et al. OMA DM-based remote software fault management for mobile devices, International Journal of Network Management Int. J. Network Mgmt 2009; 19: 491-511.*
Borg er al., A Message SystemSupporting Fault Tolerance, Auragen Systems Corporation, 1983, pp. 1-10.*

(Continued)

*Primary Examiner* — Jason K. Gee
*Assistant Examiner* — Olanrewaju Bucknor
(74) *Attorney, Agent, or Firm* — Birch, Stewart, Kolasch & Birch, LLP

(57) ABSTRACT

Device management methods and related apparatus are provided. A command is received and executed. When the command is not executed successfully, a status message comprising a first status code is generated. When the command is executed successfully, the status message comprising a second status code and an actual execution state is generated wherein the first status code is different from the second status code.

10 Claims, 7 Drawing Sheets

(56) References Cited

U.S. PATENT DOCUMENTS

| | | | |
|---|---|---|---|
| 2012/0066367 A1* | 3/2012 | Chai et al. | 709/223 |
| 2012/0143987 A1* | 6/2012 | Bhat | 709/217 |

FOREIGN PATENT DOCUMENTS

| | | |
|---|---|---|
| JP | 2008-506179 A | 2/2008 |
| KR | 10-2007-0078061 A | 7/2007 |
| TW | 200538950 A | 12/2005 |
| WO | WO 2005/073868 A1 | 8/2005 |
| WO | WO 2006/006803 A1 | 1/2006 |

OTHER PUBLICATIONS

U. Hansmann et al.; "SyncML: Synchronizing and Managing Your Mobile Data Passage", SYNCML: Synchronizing and Managing Your Mobile Data, Jan. 1, 2003; 54 pages.

OMA Device Management Protocol, Draft Version 1.3; Dec. 29, 2009; pp. 1-57.

Open Mobile Alliance, SyncML Representation Protocol Device Management Usage; Approved Version 1.1.2, published Jun. 13, 2003; pp. 1-37.

SyncML Representation Protocol Data Synchronization Usage; Version 1.1; Feb. 15, 2002; pp. 1-66.

\* cited by examiner

DEVICE MANAGEMENT METHODS AND RELATED APPARATUS FOR ENHANCING APPLICABILITY OF STATUS MESSAGES IN RESPONSE TO COMMANDS

CROSS REFERENCE TO RELATED APPLICATIONS

This application claims the benefit of U.S. Provisional Application No. 61/316,610 filed Mar. 23, 2010, the entirety of which is incorporated by reference herein.

BACKGROUND OF THE INVENTION

1. Field of the Invention

The disclosure relates generally to device management methods and systems, and, more particularly to device management methods and systems that enhance the applicability of status messages returned in response to commands for device management.

2. Description of the Related Art

Recently, portable devices, such as handheld devices, have become more and more technically advanced and multifunctional. For example, a handheld device may have telecommunication capabilities, e-mail message capabilities, an advanced address book management system, a media playback system, and various other functions. Due to increased convenience and functions of the devices, these devices have become basic necessities of life.

The Open Mobile Alliance (OMA) is a standardization body which develops open standards for the mobile phone industry. The mission of the OMA is to provide interoperable service enablers to work in different countries. The OMA Device Management (DM) protocol is a device management protocol specified by the OMA DM working group and the data synchronization (DS) working group. The OMA DM was created to support device configuration, software upgrade, and fault management functions, among others. The communication protocol in the OMA DM is a request-response protocol between a server and a client. Generally, the communication is initiated by the server, asynchronously, using any of the communication methods available such as a WAP (Wireless Application Protocol) Push or SMS (Short Message Service). Once communications is established between the server and client, a sequence of messages can be exchanged to complete a given device management task.

In the OMA DM protocol, each client has a DM tree, and supports an Inbox mechanism. In the Inbox mechanism, a server can transmit a command to the client, such as requesting the client to add a management object (MO) in the DM tree. The server can use the "./Inbox" in the URI (Uniform Resource Identifiers) of the command target, and the client can decide where to put the MO in the DM tree at will. Based on the OMA DM protocol, a client can respond to the command with a status message with a status code 200 when a command is successfully executed. After the server receives the status message, the server can know that the MO has been added to the DM tree, but doesn't know the exact path for the MO created in the client. Since the server doesn't know the exact path for the MO, the server can use a "Get" command to get the specific sub-tree of the DM tree of the client. The additional "Get" command wastes communications and system resources, such as power, and causes users to be charged more for communications fees.

BRIEF SUMMARY OF THE INVENTION

Device management methods and systems are provided.

In an embodiment of a device management method, a command is received. The command is executed. When the command is not executed successfully, a status message comprising a first status code is generated. When the command is executed successfully, the status message comprising a second status code and an actual execution state is generated. The first status code is different from the second status code.

An embodiment of a client comprises a storage unit, a reception unit, and a processing unit. The storage unit comprises a device management tree. The reception unit receives a command. The processing unit executes the command and generates a status message. When the processing unit fails to execute the command, the status message comprises a first status code. When the processing unit executes the command successfully, the status message comprises an actual execution state and a second status code different from the first status code.

An embodiment of a client comprises a storage unit, a reception unit, and a processing unit. The storage unit comprises a device management tree. The reception unit receives a command comprising a specific condition. The processing unit executes the command optionally based on the specific condition. When the execution is not based on the specific condition, the processing unit generates a status message comprising an actual execution state.

An embodiment of a client comprises a storage unit, a reception unit, and a processing unit. The storage unit comprises a device management tree. The reception unit receives a command comprising a specific path. The processing unit adds a management object to the device management tree. When the processing unit adds the management object in an actual path different from the specific path, the processing unit generates a first status code. When the processing unit adds the management object in the specific path, the processing unit generates a second status code different from the first status code.

An embodiment of a client comprises a storage unit, a reception unit, and a processing unit. The storage unit comprises a device management tree. The reception unit receives a command comprising a suggested name. The processing unit adds a node to the device management tree and names the node. When the processing unit names the node using an actual node name different from the suggested name, the processing unit generates a first status code. When the processing unit names the node using the suggested name, the processing unit generates a second status code different from the first status code.

An embodiment of a device management system comprises a server and a client. The server transmits a command. The client executes the command and transmits a status message comprising a status code and an actual execution state to the server. The server checks the status code of the status message, and determines whether to check the actual execution state based on the check of the status code.

Device management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Device management methods and systems are provided.

Figure 1:
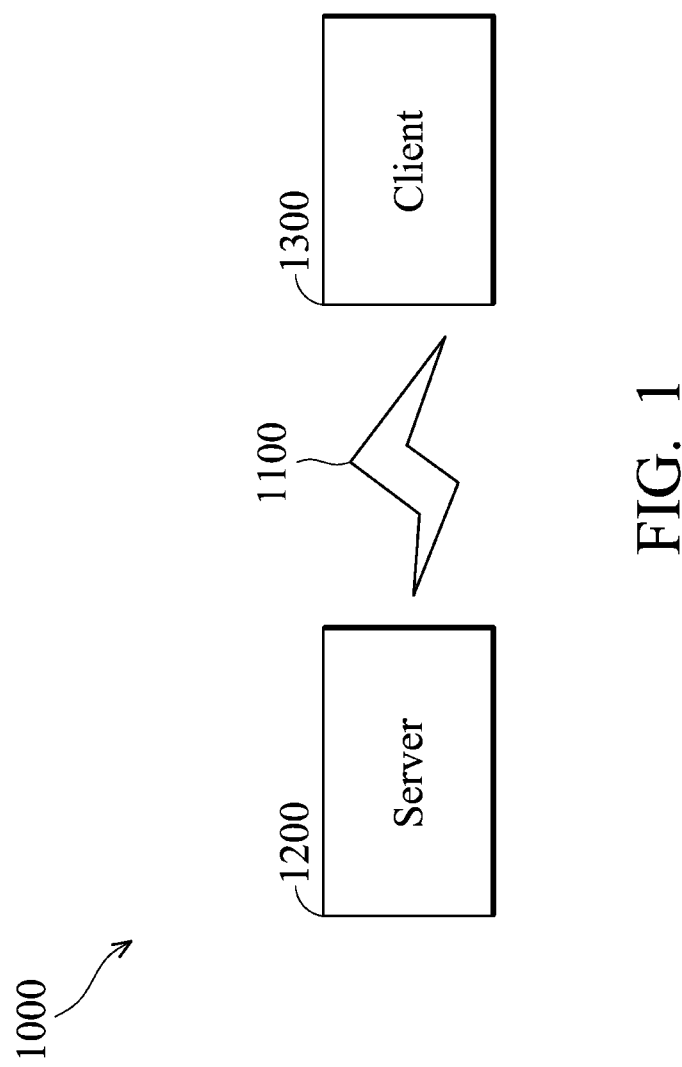
FIG. 1 is a schematic diagram illustrating an embodiment of a device management system of the invention.

FIG. 1 is a schematic diagram illustrating an embodiment of a device management system of the invention.

The device management system 1000 comprises a server 1200 and at least one client 1300. The server 1200 and the client 1300 comprising a device management (DM) tree can couple with each other via a transmission medium 1100, such as wired or wireless communication. It is understood that, when the transmission medium 1100 is a wireless communication, any of the methods available such as a WAP Push or SMS can be used for transmission between the server 1200 and the client 1300. The server 1200 can perform related device management processes for the client 1300.

Figure 2:
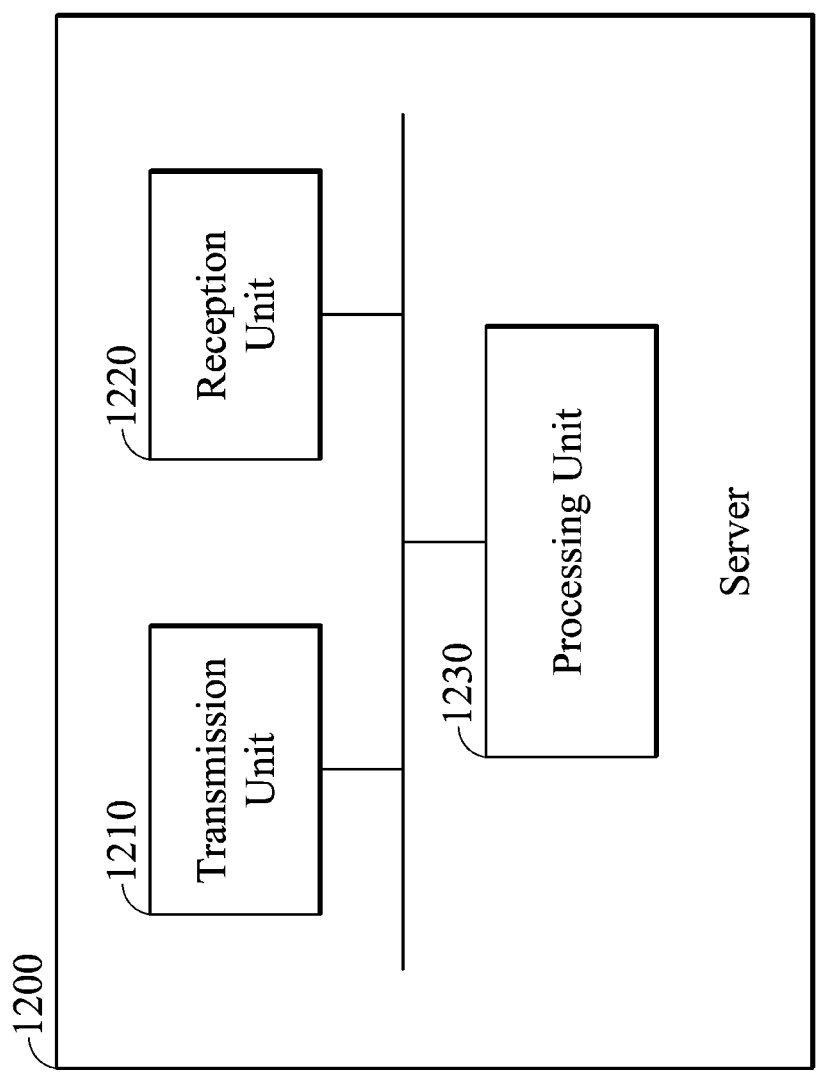
FIG. 2 is a schematic diagram illustrating an embodiment of a server of the invention.

FIG. 2 is a schematic diagram illustrating an embodiment of a server of the invention. The server 1200 may be an electronic device. The server 1200 comprises a transmission unit 1210, a reception unit 1220, and a processing unit 1230. In some embodiments, the transmission unit 1210 or the reception unit 1220 may be a wired or wireless network adapter. In some embodiments, the transmission unit 1210 and the reception unit 1220 can be integrated as a transceiver unit. The processing unit 1230 can transmit a command without any condition or with a specific condition to the client 1300 via the transmission unit 1210, receive a status message returned from the client 1300 via the reception unit 1220, and perform related analysis according to the received status message.

It is noted that, the command may be various according to different applications. In some embodiments, the command may have no condition, and the command will request the client 1300 to perform an operation to the DM tree. In some embodiments, the command may have a specific condition, and the command will request the client 1300 to perform an operation to the DM tree using the specific condition. In the Inbox mechanism, the command requests the client 1300 to add a MO to the DM tree, wherein the server 1200 can use the "./Inbox" in the URI of the command target. It is also understood that, in some embodiments, the command may also requests the client 1300 to add a MO to the DM tree in a path specified in the specific condition. Further, the command could request the client 1300 to add a node to the DM tree, and name the node using a suggested name specified in the specific condition, wherein the server 1200 can put the suggested node name in the URI of the command target. It is understood that, the above embodiments are only examples of the present application, and the present invention is not limited thereto.

Figure 3:
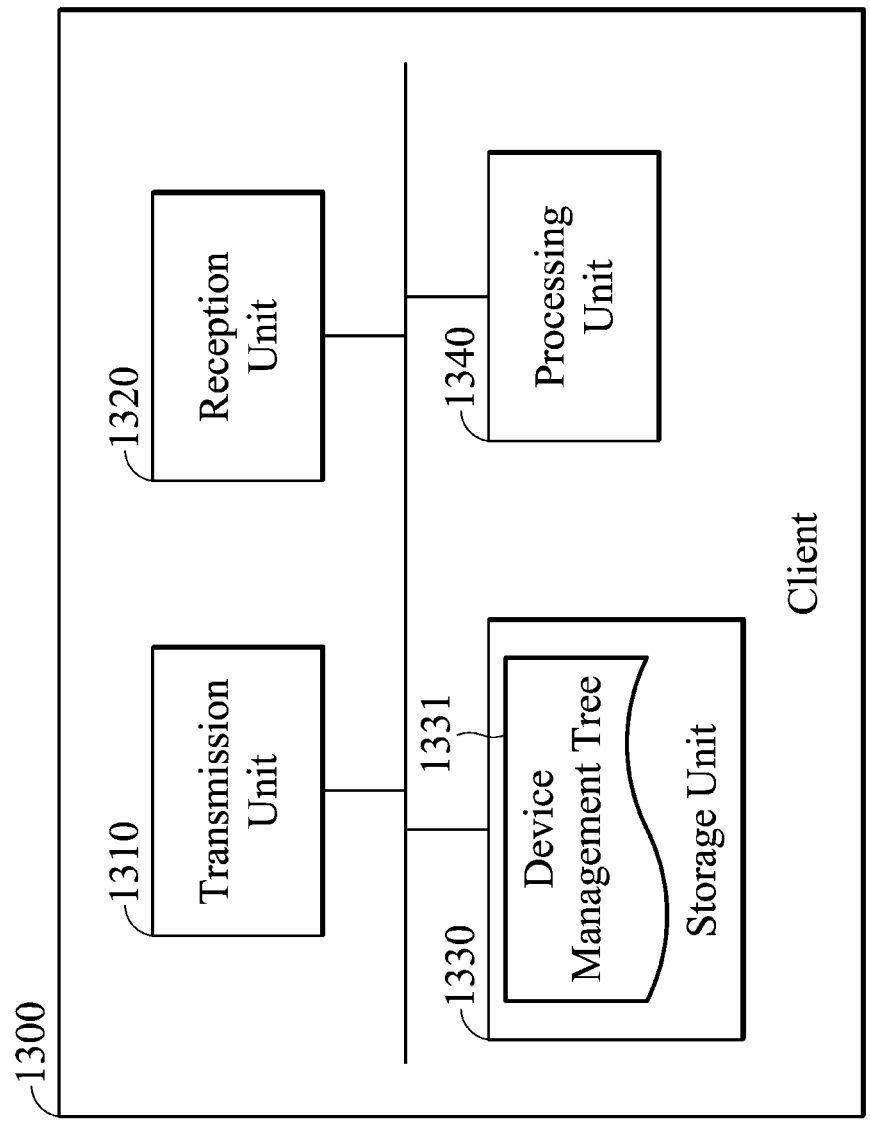
FIG. 3 is a schematic diagram illustrating an embodiment of a client of the invention.

FIG. 3 is a schematic diagram illustrating an embodiment of a client of the invention. The client 1300 may be an electronic device, such as a computer and a mobile device, comprising a PDA, a smart phone, a mobile phone, an MID, or a Netbook. The client 1300 comprises a transmission unit 1310, a reception unit 1320, a storage unit 1330, and a processing unit 1340. Similarly, in some embodiments, the transmission unit 1310 or the reception unit 1320 may be a wired or wireless network adapter, and the transmission unit 1310 and the reception unit 1320 can be integrated as a transceiver unit. The storage unit 1330 can comprise a DM tree 1331 conforming to the OMA DM protocol. It is understood that, the OMA DM protocol, DM tree, and related terminologies are well known in the art, and omitted here. The processing unit 1340 can receive a command via the reception unit 1320, and execute the command. Similarly, the command may have no condition, or have a specific condition, and the command may request the client 1300 to perform an operation to the DM tree 1331 with or without using the specific condition. The processing unit 1340 can generate and return a status message based on the execution of the command, which will be discussed further in the following paragraphs.

Figure 4:
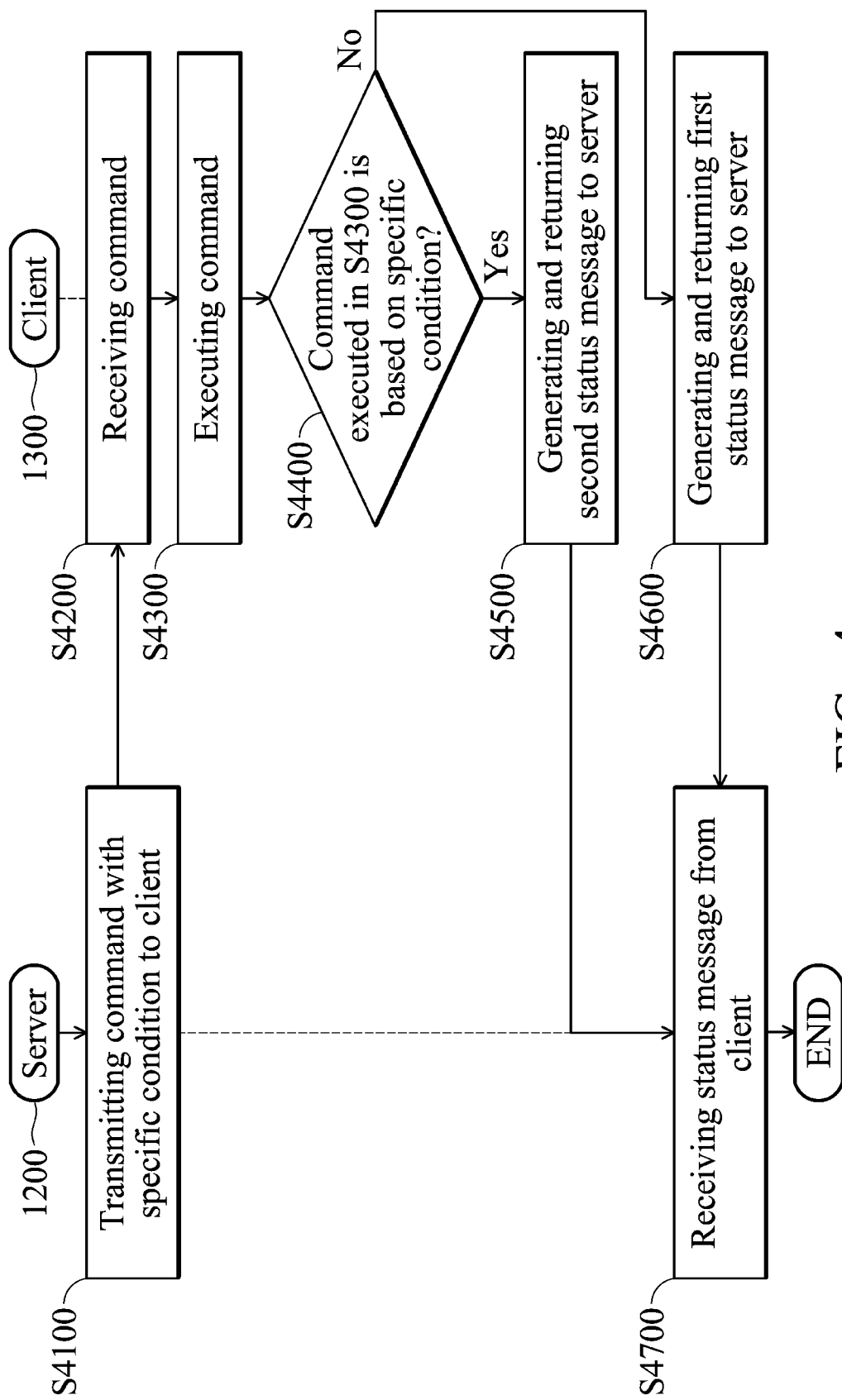
FIG. 4 is a flowchart of an embodiment of a device management method of the invention.

FIG. 4 is a flowchart of an embodiment of a device management method of the invention. The device management method can be used for a server and a client, such as an electronic device, such as a computer or a mobile device comprising a PDA, a smart phone, a mobile phone, an MID, or a Netbook.

In step S4100, the server 1200 transmits a command to the client 1300. It is noted that, the command may have a specific condition. In step S4200, the client 1300 receives the command from the server 1200, and in step S4300, the client 1300 executes the command optionally based on the specific condition. In step S4400, it is determined whether the command executed in step S4300 is based on the specific condition. When the execution is based on the specific condition (Yes in step S4400), in step S4500, the client 1300 generates and returns a second status message to the server 1200. When the execution is not based on the specific condition (No in step S4400), in step S4600, the client 1300 generates and returns a first status message to the server 1200. In step S4700, the server 1200 receives the first status message or the second status message from the client 1300. It is noted that, when the server 1200 recognizes the difference of the first status message from the second status message, the server 1200 can accordingly perform subsequent operations.

For example, in the Inbox mechanism, the specific condition may comprise a path, wherein a MO is requested to be added to the DM tree in the path. When a MO is added to the DM tree in the path specified in the specific condition, the second status message is generated and returned to the server 1200. On the other hand, when a MO is added to the DM tree, but the MO is not added in the path specified in the specific condition, the first status message is generated and returned to the server 1200.

Besides, the specific condition may comprise a suggested name. A node is requested to be added to the DM tree and named as the suggested name. When a node with a suggested name specified in the specific condition is added to the DM tree, the second status message is generated and returned to the server 1200. On the other hand, when a node is added to the DM tree, but the node is not named using the suggested name, the first status message is generated and returned to the server 1200.

It is noted that, in some embodiments, the first status message and the second status message may have different status codes. When the server 1200 recognizes the received status code (first status code) is different from the second status code, the server 1200 will know that the command executed in step S4300 is not based on the specific condition. That is to say, the actual path of the added MO or the actual node name of the added node is different from the path or the name specified in the specific condition, and the server 1200 can further determine whether to transmit another command, such as a 'Get' command to the client 1300, wherein the command requests the client 1300 to feed back the actual path of the MO in the DM tree or the actual node name of the node.

Figure 5:
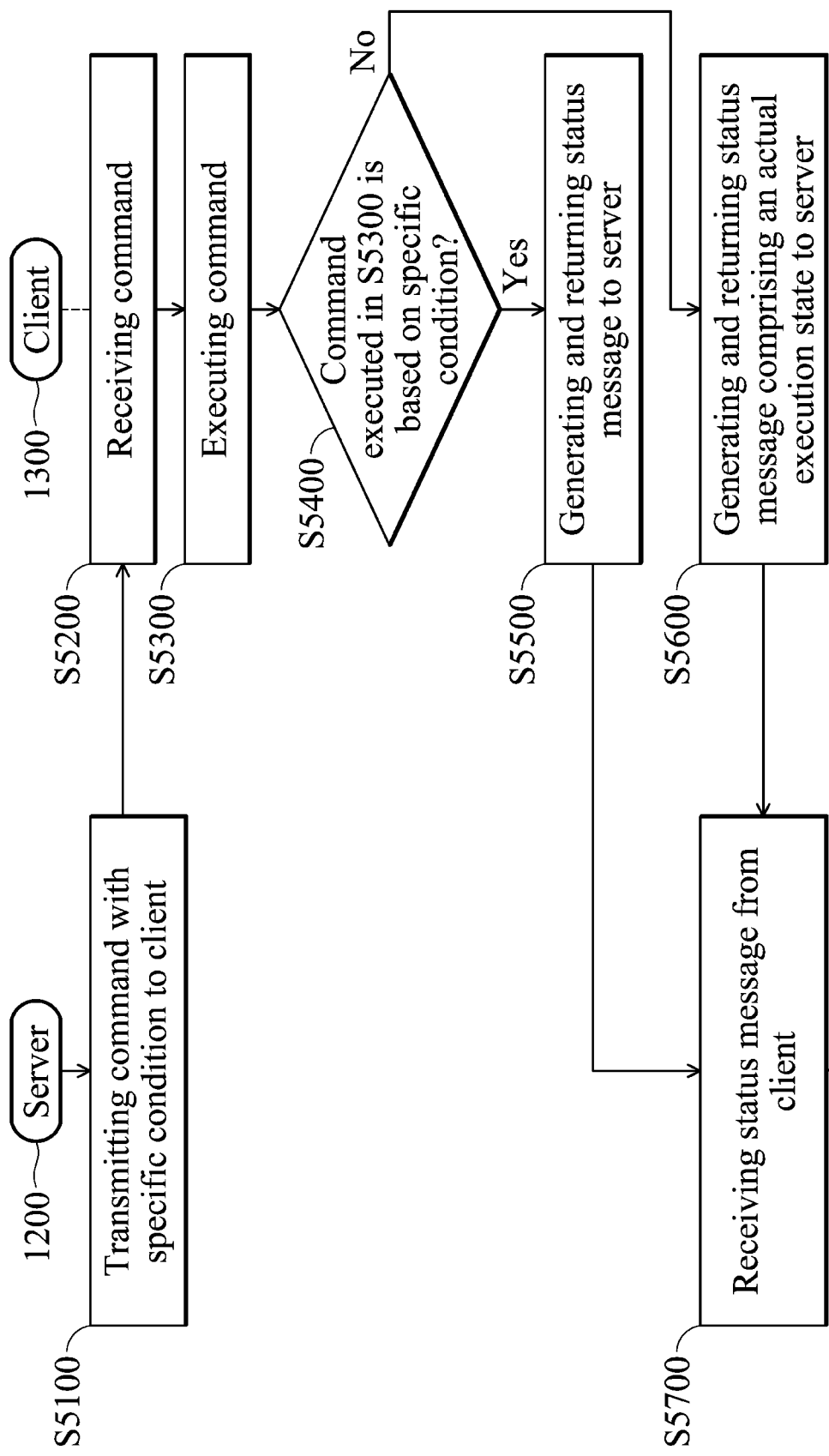
FIG. 5 is a flowchart of another embodiment of a device management method of the invention.

FIG. 5 is a flowchart of another embodiment of a device management method of the invention. Except step S5500, S5600 and S5700, the remaining steps are consistent with those in the embodiment of FIG. 4.

When the command is executed based on the specific condition (Yes in step S5400), in step S5500, the client 1300 generates and returns a status message to the server 1200. When the command is not executed based on the specific condition (No in step S5400), in step S5600, the client 1300 generates and returns a status message comprising an actual execution state to the server 1200. In step S5700, the server 1200 receives the status message generated in step S5500 or S5600 from the client 1300.

Please note that the status message generated in step S5500 may comprise a second status code or an actual execution state wherein the actual execution state is consistent with the specific condition. In addition, since the status message comprises the actual execution state, the server 1200 will directly know the actual path of the added MO or the actual node name of the added node. Consequently, the server 1200 doesn't need to transmit another command, such as a 'Get' command.

For example, in the Inbox mechanism, the specific condition may comprise a path, wherein a MO is requested to be added to the DM tree in the path. When a MO is added to the DM tree in the path specified in the specific condition, the status message is generated and returned to the server 1200 wherein the status message comprises a second status code, '200', or the requested path for the MO. On the other hand, when a MO is added to the DM tree, but the MO is not added in the path specified in the specific condition, the status message is generated and returned to the server 1200 wherein the status message comprises the actual path for the MO.

Besides, the specific condition may comprise a suggested name. A node is requested to be added to the DM tree and named as the suggested name. When a node with a suggested name specified in the specific condition is added to the DM tree, the status message is generated and returned to the server 1200 wherein the status message comprises a second status code, '200', or the suggested node name. On the other hand, when a node is added to the DM tree, but the node is not named using the suggested name, the status message is generated and returned to the server 1200 wherein the status message comprises the actual node name created for the node.

It is noted that, the status message may have several data fields. In some embodiments, a 'TargetRef' field can be used to record the actual execution state.

Figure 6:
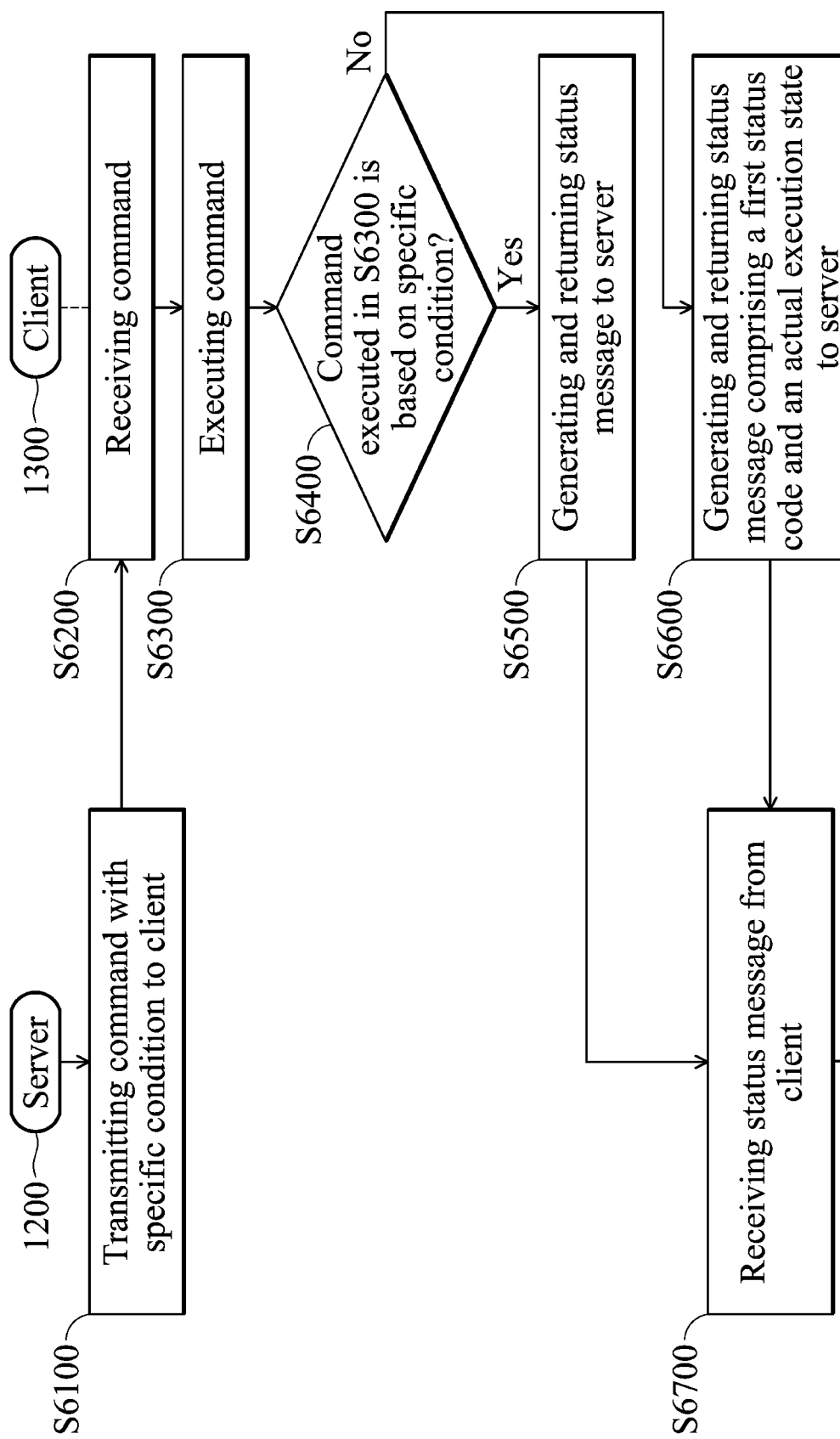
FIG. 6 is a flowchart of another embodiment of a device management method of the invention.

FIG. 6 is a flowchart of another embodiment of a device management method of the invention. Except step S6500, S6600 and S6700, the remaining steps are consistent with those in the embodiment of FIG. 4.

When the command is executed based on the specific condition (Yes in step S6400), in step S6500, the client 1300 generates and returns a status message to the server 1200. When the command is not executed based on the specific condition (No in step S6400), in step S6600, the client 1300 generates and returns a status message comprising a first status code and an actual execution state to the server 1200. In step S6700, the server 1200 receives the status message generated in step S6500 or S6600 from the client 1300.

Please note that the status message generated in step S6500 may comprise a second status code, an actual execution state or both wherein the actual execution state is consistent with the specific condition. In addition, the second status code in step S6500 is different from the first status code in step S6600.

In case the status message the server 1200 received in S6700 comprises a status code (the first or second status code) and an actual execution state, the server 1200 can check the status code first and determine whether to check the actual execution state based on the check of the status code.

For example, in the Inbox mechanism, the specific condition may comprise a path, wherein a MO is requested to be added to the DM tree in the path. When a MO is added to the DM tree in the path specified in the specific condition, the status message is generated and returned to the server 1200 wherein the status message comprises a second status code, '200', and the requested path for the MO. On the other hand, when a MO is added to the DM tree, but the MO is not added in the path specified in the specific condition, the status message is generated and returned to the server 1200 wherein the status message comprises the first status code, '220', and the actual path for the MO.

Besides, the specific condition may comprise a suggested name. A node is requested to be added to the DM tree and named as the suggested name. When a node with a suggested name specified in the specific condition is added to the DM tree, the status message is generated and returned to the server 1200 wherein the status message comprises a second status code, '200', and the suggested node name. On the other hand, when a node is added to the DM tree, but the node is not named using the suggested name, the status message is generated and returned to the server 1200 wherein the status message comprises the first status code, '220', and the actual node name created for the node.

It is noted that, the status message may have several data fields. In some embodiments, a 'TargetRef' field can be used to record the actual execution state.

Figure 7:
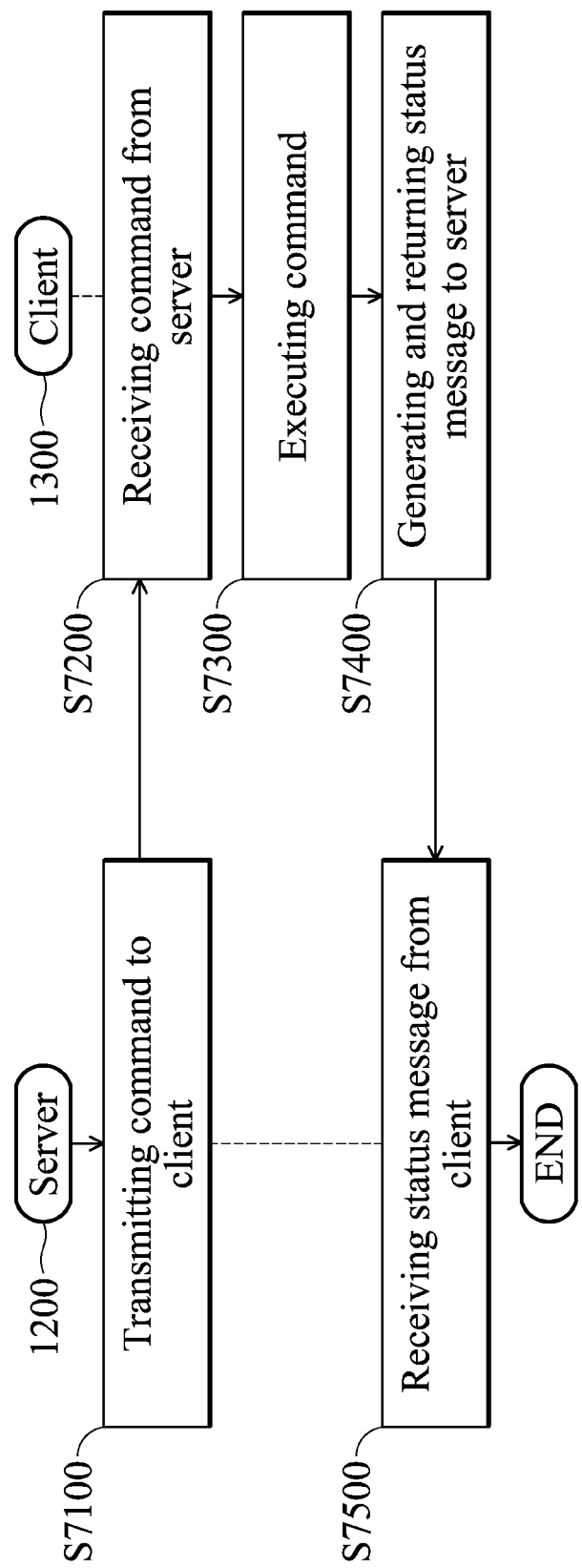
FIG. 7 is a flowchart of another embodiment of a device management method of the invention.

FIG. 7 is a flowchart of another embodiment of a device management method of the invention. The device management method can be used for a server and a client.

In step S7100, the server 1200 transmits a command to the client 1300. In step S7200, the client 1300 receives the command from the server 1200, and in step S7300, the client 1300 executes the command. In step S7400, the client 1300 generates and returns a status message to the server 1200. In step S7500, the server 1200 receives the status message from the client 1300.

It is noted that in case the client 1300 executes the command successfully, the status message comprises a second status code and an actual execution state indicating the executing result. On the other hand, in case the client 1300 fails to execute the command, the status message comprises a first status code different from the second status code.

For example, in the Inbox mechanism, the client 1300 will try to add a MO to the DM tree. When a MO is added to the DM tree successfully, the status message comprises a second status code, e.g. "200", and the actual MO path. Consequently, the server 1200 can get the executing result directly. On the other hand, when the client 1300 fails to add a MO, the status message comprises a first status code, e.g. "220", different from the second status code.

Besides, the client 1300 will try to add a node to the DM tree and name it. When a node is added and named successfully, the status message comprises a second status code, e.g. "200", and the actual node name. Consequently, the server 1200 can get the executing result directly. On the other hand, when the client 1300 fails to add and name a node, the status message comprises a first status code, e.g. "220", different from the second status code.

Therefore, the device management methods and systems of the invention can enhance the applicability of status messages returned in response to commands for device management; thus, reducing unnecessary communications and saving system resources, and avoiding additional communication charges.

Device management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed:

1. A client, comprising:
   a storage device comprising a device management tree;
   a reception device configured to receive a command from a server comprising a specific condition;
   a processor configured to execute the command and generate a status message based on whether the command is executed based on the specific condition; and
   a transmission device configured to transmit the status message to the server,
   wherein the specific condition comprises a specific path in the device management tree, and the command requests the processor to add a management object to the device management tree, or the specific condition comprises a suggested name, and the command requests the processor to add a node to the device management tree and name the node;
   wherein under the condition that the command is not executed based on the specific condition, the status message comprising an actual path for the management object is generated when the processor adds the management object in an actual path different from the specific path, or the status message comprising an actual node name is generated, when the processor adds the node to the device management tree and names the node using an actual node name different from the suggested name.

2. The client of claim 1, wherein when the processor adds the management object in the specific path, the status message generated by the processor comprises the specific path for the management object.

3. The client of claim 1, wherein when the processor adds the management object in the specific path, the status message generated by the processor comprises a second status code, and when the processor adds the management object in the actual path different from the specific path, the status message generated by the processor further comprises a first status code different from the second status code.

4. The client of claim 1, wherein when the processor names the node using the suggested name, the status message generated by the processor comprises the suggested name.

5. The client of claim 1, wherein when the processor names the node using the suggested name, the status message generated by the processor comprises a second status code, and when the processor names the node using the actual node name different from the suggested name, the first status message generated by the processor further comprises a first status code different from the second status code.

6. A device management method for use in an electronic device comprising a device management tree and a processor, the method comprising steps of:
   receiving a command comprising a specific condition from a server;
   executing the command and generating a status message based on whether the command is executed based on the specific condition, by the processor; and
   transmitting the status message to the server;
   wherein the specific condition comprises a specific path in the device management tree, and the command requests the processor to add a management object to the device management tree, or the specific condition comprises a suggested name, and the command requests the processor to add a node to the device management tree and name the node;
   wherein under the condition that the command is not executed based on the specific condition, the status message comprising an actual path for the management object is generated when the processor adds the management object in an actual path different from the specific path, or the status message comprising an actual node name is generated, when the processor adds the node to the device management tree and names the node using an actual node name different from the suggested name.

7. The device management method of claim 6, wherein when the processor adds the management object in the specific path, the status message comprises the specific path for the management object.

8. The device management method of claim 6, wherein when the processor adds the management object in the specific path, the status message comprises a second status code; and when the processor adds the management object in the actual path different from the specific path, the status message further comprises a first status code different from the second status code.

9. The device management method of claim 6, wherein when the processor names the node using the suggested name, the status message generated by the processor comprises the suggested name.

10. The device management method of claim 6, wherein when the processor names the node using the suggested name, the status message generated by the processor comprises a second status code; and when the processor names the node using the actual node name different from the suggested name, the status message generated by the processor further comprises a first status code different from the second status code.

* * * * *